United States Patent [19]

Okawara et al.

[11] Patent Number: 4,634,651

[45] Date of Patent: Jan. 6, 1987

[54] NON-AQUEOUS TYPE RESIN AND ELECTROPHOTOGRAPHIC DEVELOPER CONTAINING THE SAME

[75] Inventors: Makoto Okawara, Tokyo; Kazuo Tsubuko, Numazu, both of Japan

[73] Assignee: Ricoh Co., Ltd., Tokyo, Japan

[21] Appl. No.: 768,882

[22] Filed: Aug. 23, 1985

[30] Foreign Application Priority Data

Aug. 31, 1984 [JP] Japan ................................ 59-183266
Aug. 31, 1984 [JP] Japan ................................ 59-183269

[51] Int. Cl.$^4$ ..................... G03G 9/12; C08L 23/04; C08L 25/02

[52] U.S. Cl. ................................ 430/114; 526/240; 526/241; 526/318

[58] Field of Search ................. 430/114; 526/240, 241, 526/318

[56] References Cited

U.S. PATENT DOCUMENTS 3,933,748 1/1976 Matsuda et al. ................ 526/240 X
4,292,419 9/1981 Kamada et al. ................ 526/240 X

FOREIGN PATENT DOCUMENTS 58-16249 1/1983 Japan .................................. 430/114
2095685 10/1982 United Kingdom ................. 430/114

Primary Examiner—Roland E. Martin
Attorney, Agent, or Firm—Flynn, Thiel, Boutell & Tanis

[57] ABSTRACT

This invention relates to a non-aqueous type resinous composition obtained by polymerizing a polymerizable composition containing at least monomer A represented by the general formula (I),

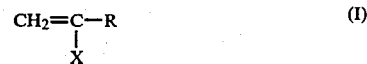

(wherein R represents —H or —CH$_3$, X representing —COOC$_n$H$_{2n+1}$ or —O—CO—C$_n$H$_{2n+1}$, and n representing an integer of 6–20) and monomer B represented by the general formula (II),

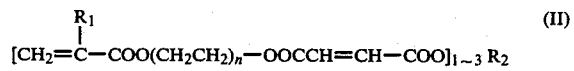

(wherein R represents —H or —CH$_3$, n representing an integer of 1–20, and M representing —H, Na, K, Mg, Mn, Ca, Li, Al or Co) in the presence of a polymerization initiator in an aliphatic hydrocarbon solvent.

10 Claims, No Drawings

NON-AQUEOUS TYPE RESIN AND ELECTROPHOTOGRAPHIC DEVELOPER CONTAINING THE SAME

BACKGROUND OF THE INVENTION

The present invention relates to a non-aqueous type resin useful for a developer for electrostatic photography, particularly toner for color copy, paints, adhesives, printing inks, dispersion polymers for magnetic materials, and the like.

Examples of conventional well known polymerizable monomers having polar groups include acrylic acid, methacrylic acid, itaconic acid, maleic acid, fumaric acid, hydroxyethylacrylate, hydroxyethylmethacrylate, glycidylmethacrylate and the like. Polar groups of these polymerizable monomers cause ionic dissociation in an aqueous solvent and the dispersion stability of pigments is improved. However, the ionic dissociation is not caused in a non-aqueous solvent such as a liquid developer for electrophotography (e.g. isoparaffin) and the electric charge of polymer does not appear. Therefore, it was difficult to control the electric charge for color pigment particles. In such a case, a method for ionizing a carboxyl group with base was employed, but it was difficult to make a balance of acid-base and therefore stable electric charge could not be maintained.

Many of toners used for a developer generally have a particle size distribution of 0.3–1.0μ. A color toner having a smaller particle size and a narrower particle size distribution has been desired.

SUMMARY OF THE INVENTION

An object of the present invention is to provide a resin free from the above mentioned conventional faults, which has electric charge in a non-aqueous type solvent and is excellent in the dispersibility of pigments and also excellent in electric charge control and fixativity when used as electrophotographic toner, paint, printing ink and the like.

Particularly, the present invention provides a liquid developer (color toner) having organic pigments finely dispersed in such a manner as to improve color reproducibility and excellent in electric charge control of tonor particles, fixativity, glossiness, preservation stability and the like.

That is, an object of the present invention is to provide a non-aqueous type resinous composition obtained by polymerizing a polymerizable composition containing at least monomer A represented by the general formula (I),

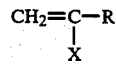

(wherein R represents —H or —CH$_3$, X representing —COOC$_n$H$_{2n+1}$ or —O—CO—C$_n$H$_{2n+1}$, and n representing an integer of 6–20) and monomer B represented by the general formula (II),

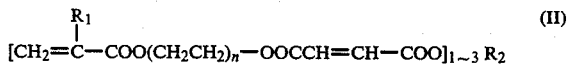

(wherein R$_1$ represents —H or —CH$_3$, n representing an integer of 1–20, m is an integer of from 1 to 3 and M representing —H, Na, K, Mg, Mn, Ca, Li, Al or Co) in the presence of a polymerization initiator in an aliphatic hydrocarbon solvent.

Another object of the present invention is to provide a liquid developer for electrophotography containing the above mentioned non-aqueous type resin.

DETAILED EXPLANATION OF THE INVENTION

Examples of a solvent used for preparing the resin and the liquid developer for electrophotography of the present invention include petroleum type aliphatic hydrocarbons or halogenated aliphatic hydrocarbons such as kerosene, ligroin, n-hexane, n-heptane, n-octane, i-octane, i-dodecane (commercially available examples of these include "Isopar" H, G, L, K; Naphtha No. 6; "Solvesso" 100 and the like produced by Exxon Corp.), carbon tetrachloride, perfluoroethylene and the like. Aromatic solvents such as toluene, xylene and the like may be added in a small amount to these aliphatic solvents.

Ordinary radical polymerization catalysts can be used as a polymerization initiator for preparing the resin of the present invention. Examples of these include organic peroxides such as benzoyl peroxide, di-t-butyl peroxide, dicumyl peroxide, methylethylketone peroxide, t-butyl perphthalate, t-butyl perbenzoate, methyl isobutylketone peroxide, lauroyl peroxide, cyclohexyl peroxide, 2,5-dimethyl-2,5-di-t-butyl peroxyhexane, t-butyl peroctanoate, t-butyl perisobutyrate, t-butyl peroxyisopropyl carbonate and the like; azo compounds such as methyl-2,2'-azabisisobutyrate, 1,1'-azobiscyclohexanecarbonitrile, 2-phenylazo-2,4-dimethyl-4-methoxyvaleronitrile, 2-carbomoyl-azobisisobutyronitrile, 2,2'-azobis-(2,4-dimethylvaleronitrile) and 2,2'-azobisisobutyronitrile; and the like. The polymerization initiator is used in an amount of about 0.1–2.0% by weight on the basis of the total weight of monomers.

Examples of monomer A used for preparing the resin of the present invention include lauryl methacrylate, lauryl acrylate, stearyl methacrylate, stearyl acrylate, 2-ethylhexyl methacrylate, 2-ethylhexyl acrylate, dodecyl methacrylate, dodecyl acrylate, hexyl methacrylate, hexyl acrylate, octyl methacrylate, octyl acrylate, cetyl methacrylate, cetyl acrylate, vinyl laurate, vinyl stearate and the like.

Examples of monomer B used for preparing the resin of the present invention include as follows:

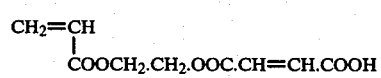 No. 1.

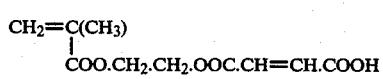 No. 2.

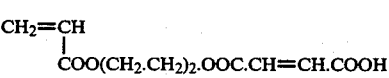 No. 3.

 No. 4.

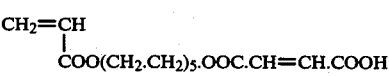 No. 5.

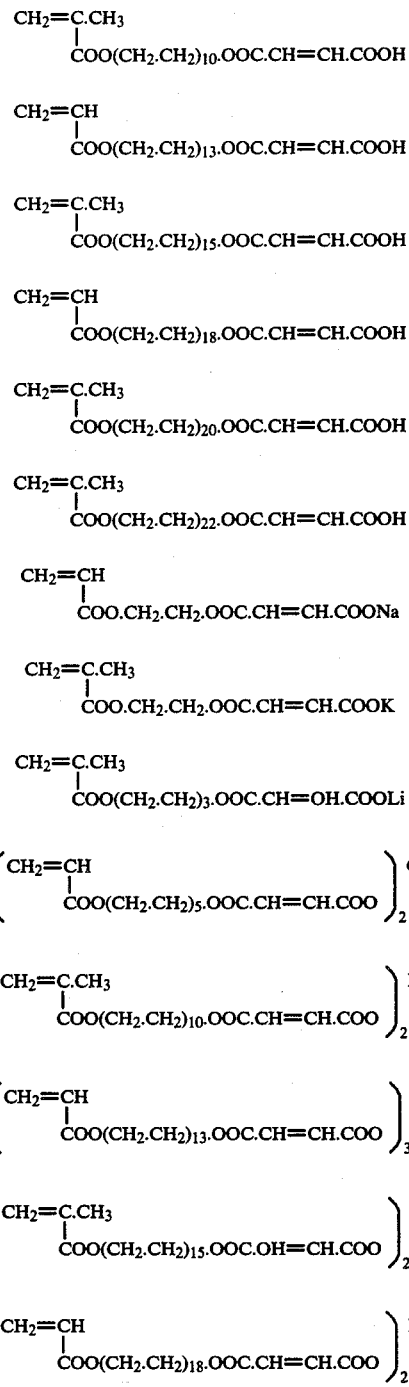

-continued

No. 6. $CH_2=C.CH_3$ | $COO(CH_2.CH_2)_{10}.OOC.CH=CH.COOH$

No. 7. $CH_2=CH$ | $COO(CH_2.CH_2)_{13}.OOC.CH=CH.COOH$

No. 8. $CH_2=C.CH_3$ | $COO(CH_2.CH_2)_{15}.OOC.CH=CH.COOH$

No. 9. $CH_2=CH$ | $COO(CH_2.CH_2)_{18}.OOC.CH=CH.COOH$

No. 10. $CH_2=C.CH_3$ | $COO(CH_2.CH_2)_{20}.OOC.CH=CH.COOH$

No. 11. $CH_2=C.CH_3$ | $COO(CH_2.CH_2)_{22}.OOC.CH=CH.COOH$

No. 12. $CH_2=CH$ | $COO.CH_2.CH_2.OOC.CH=CH.COONa$

No. 13. $CH_2=C.CH_3$ | $COO.CH_2.CH_2.OOC.CH=CH.COOK$

No. 14. $CH_2=C.CH_3$ | $COO(CH_2.CH_2)_3.OOC.CH=OH.COOLi$

No. 15. $\left( CH_2=CH \mid COO(CH_2.CH_2)_5.OOC.CH=CH.COO \right)_2 Ca$

No. 16. $\left( CH_2=C.CH_3 \mid COO(CH_2.CH_2)_{10}.OOC.CH=CH.COO \right)_2 Mg$ No. 17. $\left( CH_2=CH \mid COO(CH_2.CH_2)_{13}.OOC.CH=CH.COO \right)_3 Al$ No. 18. $\left( CH_2=C.CH_3 \mid COO(CH_2.CH_2)_{15}.OOC.OH=CH.COO \right)_2 Co$ No. 19. $\left( CH_2=CH \mid COO(CH_2.CH_2)_{18}.OOC.CH=CH.COO \right)_2 Mn$ The above monomer A has properties of solvating with the above solvents before of after polymerization. Accordingly, the copolymer thus obtained is present in a solvent as a dispersion of monomer B having monomer A bonded therearound, the monomer A being solvated with the solvent. The monomer A component in the copolymer contributes to the improvements in dispersion stability (i.e. preservation stability) and adhesive properties of toners. Monomers A and B are used in a weight ratio of monomer B/monomer A=0.01-1/1. Other polymerizable monomers (hereinafter referred to as monomer C) may be added to monomers A and B.

Monomer C is used in a weight ratio of monomer C/monomer A=0.01-1/1.

Monomer B is an organic polar monomer having $(-CH_2-CH_2-)_n$ group. The monomer B like acrylic acid does not sufficiently dissolve in an aqueous solution, but has properties of solvating with a non-aqueous type solvent. Accordingly, an organic polar polymer having a carboxyl group forms an appropriate amount of carboxylate anion and causes electric charges on a polymer in the copolymerization with acrylic ester having a long chain.

In accordance with the present invention, a polymer soluble in a non-aqueous solvent, partly gelled half-dissolved polymer, bead polymer, insoluble polymer and the like are prepared by the well known methods.

Examples of the above monomer C include styrene, vinyl toluene, vinyl acetate, acrylic acid, methacrylic acid, alkyl (carbon number=1-5) esters of acrylic acid or methacrylic acid (for example methyl methacrylate, ethyl acrylate, methyl acrylate, ethyl methacrylate, butyl methacrylate and the like), polyhydric alcohol esters of acrylic acid or methacrylic acid (for example ethylene glycol diacrylate, ethylene glycol dimethacrylate, diethylene glycol diacrylate, diethylene glycol methacrylate, triethylene glycol triacrylate, triethylene glycol trimethacrylate, butanediol diacrylate, butane diol dimethacrylate, 1,6-hexanediol diacrylate, 1,6-hexanediol dimethacrylate, trimethylol propane triacrylate, trimethylol propane trimethacrylate, tetramethylol methane triacrylate, tetramethylol methane trimethacrylate, tetramethylol methane tetraacrylate, tetramethylol methane tetramethacrylate, dipropylene glycol diacrylate, dipropylene glycol dimethacrylate, trimethylol hexane triacrylate, trimethylol hexane trimethacrylate, pentaerythritol tetraacrylate, pentaerythritol tetramethacrylate, 1,3-butylene glycol diacrylate, 1,3-butylene glycol dimethacrylate, trimethylol ethane triacrylate, trimethylol ethane trimethacrylate, allyl methacrylate, metaallyl methacrylate and the like), o-divinyl benzene, m-divinyl benzene, p-divinyl benzene, p-methyldivinyl benzene, o-ethyldivinyl benzene, o-butyldivinyl benzene, p-butyldivinyl benzene, m-hexyldivinyl benzene, o-nonyldivinyl benzene, p-decyldivinyl benzene, o-undecyldivinyl benzene, p-stearyldivinyl benzene, o-methyldivinyl benzene, o-ethyldivinyl benzene, p-hexyldivinyl benzene, p-nonyldivinyl benzene, m-decyldivinyl benzene, p-undecyldivinyl benzene, o-stearyldivinyl benzene, N-vinyl pyridine, glycidyl methacrylate, fumaric acid, allyl methacrylate and the like.

Powdery silica and polyolefin or wax having a softening point of 60°-130° C. may be added in the preparation step of copolymer in accordance with the present invention. The powdery silica thus added is captured by the network structure of copolymer. The silica itself is not subjected to physical changes such as dissolution and the like during the reaction. The powdery silica is effective for improving the dispersion stability of toner since it has a specific gravity close to that of aliphatic hydrocarbon or halogenated aliphatic hydrocarbon solvent used as a dispersion medium and prevents the polymer from gelling. When using wax or polyolefin, this dissolves in the reaction medium during the polymerization reaction and precipitates as fine particles by cooling after the reaction. Thus, the copolymer is present in the state of being adsorbed by or mixed with the wax or polyolefin fine particles. In the same manner as in powdery silica, wax or polyolefin has a specific gravity and molecular structure substantially similar to those of the dispersion medium and prevents the copolymer from gelling. Therefore, this is also effective for improving the dispersion stability of toner. In addition to these properties, since wax or polyolefin has a lower softening point, it is effective also for improving adhesiveness (fixativity). Silica, wax or polyolefin is suitably used in an amount of 5–200 parts by weight to 100 parts by weight of polymer.

Examples of commercially available wax or polyolefin having a softening point of 60°–130° C. include as follows:

| Maker | Trade Name | Softening Point (°C.) |
|---|---|---|
| *Examples of polyethylene* | | |
| Union Carbide | DYNI | 102 |
| | DYNF | 102 |
| | DYNH | 102 |
| | DYNJ | 102 |
| | DYNK | 102 |
| Monsanto Co. | ORLIZON 805 | 116 |
| | ORLIZON 705 | 116 |
| | ORLIZON 50 | 126 |
| Phillips Co. | MARLEX 1005 | 92 |
| Du Pont Co. | ALATHON 3 | 103 |
| | ALATHON 10 | 96 |
| | ALATHON 12 | 84 |
| | ALATHON 14 | 80 |
| | ALATHON 16 | 95 |
| | ALATHON 20 | 86 |
| | ALATHON 22 | 84 |
| | ALATHON 25 | 96 |
| Allied Chemical Corp. | AC-Polyethylene 1702 | 98 |
| | AC-Polyethylene 6 & 6A | 102 |
| | AC-Polyethylene 615 | 105 |
| Sanyo Chemical Industries Ltd. | Sun Wax 131-P | 108 |
| | Sun Wax 151-P | 107 |
| | Sun Wax 161-P | 111 |
| | Sun Wax 165-P | 107 |
| | Sun Wax 171-P | 105 |
| | Sun Wax E-200 | 95 |
| *Examples of Wax (Paraffin Wax)* | | |
| Junsei Kagaku | Paraffin Wax | 60–98 |
| Kobayashi Kako | Bees Wax | 65 |
| | Cetanol | 80 |
| Nagai Kako | Bees Wax | 65 |
| Seitetsu Kagaku | Furosen | 110 |

The liquid developer of the present invention is prepared by mixing 1 part by weight of a coloring agent with 0.3–3 parts by weight of copolymer and fully dispersing the mixture in 10–20 parts by weight of petroleum type aliphatic hydrocarbon by means of an attritor, KD-mill or the like to produce a concentrated toner.

Examples of the coloring agent include benzidine type organic pigment, phthalocyanine type organic pigment, thioindigo type organic pigment, Methyl Orange, Brilliant Carmine, Alkali Blue, First Red, Crystal Violet, Chromo Fine Red and the like. In addition to these coloring agents, carbon black can also be used as a coloring agent. If necessary, a polar controller may be added.

The present invention is further illustrated by the following Examples and Preparation Examples, but is not limited thereto.

PREPARATION OF COPOLYMER

Example 1

300 g of isooctane was placed in a 2.0 liter four-forked flask equipped with a stirrer, thermometer and reflux cooler, and was heated at 95° C. A solution comprising 190 g of dodecyl methacrylate, 10 g of o-butyldivinyl benzene, 20 g of the above listed No. 4 Monomer B and 6 g of azobisisobutyronitrile was added dropwise to the flask for 3 hours. The resultant mixture was heated at the above temperature with stirring for further 4 hours to cause polymerization reaction, thus obtaining a resinous dispersion of a viscosity of 210 cp having a polymerization ratio of 95.0%.

Example 2

300 g of the resinous dispersion prepared in the above Example 1 was mixed with 10 g of colloidal silica in a flask, and the resultant mixture was heated at 100° C. for 3 hours. After cooling, a resinous dispersion of a viscosity of 220 cp containing colloidal silica having a particle diameter of 0.3–0.4μ was obtained.

Example 3

300 g of isododecane was placed in a flask of the same type as used in Example 1, and was heated at 90° C. A solution comprising 300 g of lauryl methacrylate, 25 g of the above listed No. 1 Monomer B, 28 g of allyl methacrylate and 3 g of benzoyl peroxide was added dropwise to the flask for 1.5 hours. The resultant mixture was heated at 95° C. for further 4 hours with stirring to cause polymerization reaction, thus obtaining a resinous dispersion of a viscosity of 180 cp having a polymerization ratio of 96.5%. To the resultant resinous dispersion, was added dropwise a resinous solution of 50 g of vinyl toluene and 1 g of benzoyl peroxide at 90° C. to polymerize for four hours, thus obtaining a polymer of a polymerization ratio of 97.2% having negative charge.

The electric charge of the polymer was measured in the following manner. 25 ml of a dispersion having 3% by weight of polymer dispersed in kerosene was placed in a 100 ml beaker, and 1000 V was applied between copper electrodes of 20 mm×40 mm, the distance between the two electrodes being 10 mm. A polymer electrodeposited on the anode was evaluated as a negatively charged polymer, while a polymer electrodeposited on the cathode was evaluated as a positively charged polymer.

Example 4

300 g of the resinous dispersion prepared in the above Example 3 was mixed with 20 g of bees wax in a flask, and the resultant mixture was stirred at 90° C. for 2 hours. After cooling, a resinous dispersion of a viscosity of 580 cp having a particle diameter of 0.1–1.0μ was obtained. The polymer thus obtained was negatively charged.

Example 5

300 g of Sun Wax 171-P was placed in a flask of the same type as used in Example 1, and was heated at 90° C. A solution comprising 150 g of 2-ethylhexyl methacrylate, 30 g of the above listed No. 15 Monomer B, 20 g of p-divinyl benzene and 6.3 g of lauroyl peroxide was added dropwise to the flask for 3 hours. The resultant mixture was stirred at the above temperature for further 4 hours to cause polymerization reaction, thus obtaining a resinous dispersion of a viscosity of 690 cp having a polymerization ratio of 98.2% and a particle size of 0.1–3.0μ. The polymer thus obtained was positively charged.

Example 6

300 g of Isopar L and 200 g of polyethylene (AC-6 of Allied Chemical Co.) were placed in a flask of the same type as used in Example 1, and were heated at 95° C. A solution comprising 180 g of stearyl methacrylate, 20 g of the above listed No. 11 Monomer B, 20 g of allyl methacrylate and 4 g of lauryl peroxide was added dropwise to the flask for 3 hours. The resultant mixture was stirred at the above temperature for further 3 hours to cause polymerization reaction, thus obtaining a resinous dispersion of a viscosity of 200 cp having a polymerization ratio of 95.4% and a particle size of 0.8–2.2μ. The polymer thus obtained was negatively charged.

Example 7

300 g of Isopar H, 180 g of cetyl methacrylate, 40 g of dodecyl acrylate, 15 g of meta-allyl methacrylate, 30 g of the above listed Monomer B No. 19, and 3 g of benzoyl peroxide were placed in a flask of the same type as used in Example 1, and were polymerized at 90° C. for 6 hours to obtain a resinous dispersion of a viscosity of 240 cp having a polymerization ratio of 98% and a particle diameter of 1–3μ. The polymer thus obtained was positively charged.

The preparation Examples of the developer for electrophotography of the present invention and the use Examples thereof are illustrated hereinafter.

Example 8

| | |
|---|---|
| Benzidine Yellow (manufactured by Dainippon Seika) | 20 g |
| Polymer prepared in Example 1 | 60 g |
| Kerosene | 150 g |

The above components were dispersed in an attritor for 3 hours to prepare a concentrated toner. The toner thus obtained had a particle diameter of 0.21–0.33μ.

Example 9

| | |
|---|---|
| Phthalocyanine (manufactured by Toyo Ink) | 20 g |
| Polymer prepared in Example 2 | 80 g |
| Isopar G | 150 g |

The above components were dispersed in a ball mill for 24 hours to prepare a concentrated toner. The toner thus obtained had a particle diameter of 0.08–0.23μ.

Example 10

| | |
|---|---|
| Brilliant Carmine (manufactured by Dainippon Ink and Chemicals Inc.) | 20 g |
| Polymer prepared in Example 3 | 80 g |
| Isopar H | 150 g |

The above components were dispersed in an attritor for 3 hours to prepare a toner having a particle diameter of 0.04–0.21μ.

Example 11

| | |
|---|---|
| Phthalocyanine (manufactured by Dainippon Ink and Chemicals Inc.) | 20 g |
| Polymer prepared in Example 4 | 80 g |
| Kerosene | 150 g |

The above components were dispersed in an attritor for 3 hours to prepare a toner having a particle diameter of 0.05–0.15μ.

Example 12

| | |
|---|---|
| Crystal Violet (manufactured by Tokyo Kasei Mfg. Co., Ltd.) | 10 g |
| Polymer prepared in Example 5 | 80 g |
| Isopar H | 150 g |
| Manganese Naphthenate | 1 g |

The above components were dispersed in a ball mill for 48 hours to prepare a toner having a particle diameter of 0.10–0.20μ.

Example 13

| | |
|---|---|
| Carbon Black (Mitsubishi No. 44 manufactured by Mitsubishi Carbon Co., Ltd.) | 10 g |
| Polymer prepared in Example 6 | 80 g |
| Isopar G | 150 g |

The above components were dispersed in a KD-mill for 12 hours to prepare a toner having a particle diameter of 0.20–0.34μ.

Example 14

| | |
|---|---|
| Benzidine Yellow (manufactured by Dainippon Seika) | 10 g |
| Polymer prepared in Example 7 | 80 g |
| Isopar G | 150 g |

The above components were dispersed in an attritor for 12 hours to prepare a toner having a particle diameter of 0.15–0.21μ.

When a copy was made using the above prepared toner in accordance with a usual method by a color copier CR-1000 (trade name, manufactured by Ricoh Co., Ltd.), the copy thus obtained had a glossy image having an image density of 1.18 and a fixativity of 81.5%.

Example 15

| | |
|---|---|
| Mitsubishi Carbon MA 100 (manufactured by Mitsubishi Carbon Co., Ltd.) | 20 g |
| Polymer prepared in Example 6 | 80 g |
| Isopar H | 150 g |

The above components were dispersed in a KD-mill for 4 hours to prepare a toner having a particle diameter of 0.20μ. Using the toner thus obtained, copy was made by Ricopy DT-1800 R. As this result, the copy obtained had an image density of 1.32 and a fixativity of 83.8% and the preservability was stable for at least one year.

As mentioned above, the non-aqueous type resin of the present invention has an electric charge in a non-aqueous type solvent, and is excellent in dispersibility, charge controlling properties, fixativity and the like.

The developer prepared by using the resin of the present invention comprises a satisfactory toner having a smaller particle size and a narrower range of particle size distribution. Therefore, when the toner of the present invention is used as a color toner, it provides an excellent color reproducibility. The toner of the present invention provides satisfactory dispersion stability, preservability, fixativity, gloss and the like also when used for general use.

What we claim is:

1. A non-aqueous resin dispersion obtained by polymerizing, under suspension polymerization conditions, a copolymerizable monomer composition mixed in an aliphatic hydrocarbon solvent, in the presence of a polymerization initiator, said copolymerizable monomer composition containing monomer A having the formula $$CH_2=C-R$$
$$\phantom{CH_2=C-}X$$

wherein R is H or $CH_3$, X is $COOC_nH_{2n+1}$ or $OCOC_nH_{2n+1}$ and n is an integer of from 6 to 20, and monomer B having the formula $$[CH_2=\underset{\underset{R_1}{|}}{C}-COO(CH_2CH_2)_{n1}-OOCCH=CH-COO]_m R_2 \qquad (II)$$

wherein $R_1$, is H or $CH_3$, $n_1$ is an integer of from 1 to 20, m is an integer of from 1 to 3, and $R_2$ selected from the group consisting of H, Na, K, Mg, Mn, Ca, Li, Al and Co.

2. A non-aqueous resin dispersion as claimed in claim 1 in which the weight ratio of (monomer A/monomer B) is from (0.01/1) to (1/1).

3. The non-aqueous resin dispersion as claimed in claim 1, wherein said copolymerizable monomer composition further contains a copolymerizable monomer C different from monomer A and monomer B.

4. The non-aqueous resin dispersion as claimed in claim 3, wherein the weight ratio of monomer B:monomer C:monomer A is 0.01–1:0.01–1:1.

5. The non-aqueous resin dispersion as claimed in claim 3, wherein said resin dispersion further contains at least one substance selected from the group consisting of powdery silica, wax and polyolefin.

6. A non-aqueous resin dispersion comprising a copolymer dispersed in an aliphatic hydrocarbon solvent, said copolymer comprising recurring units of monomer A having the formula $$CH_2=C-R$$
$$\phantom{CH_2=C-}X$$

wherein R is H or $CH_3$, X is $COOC_nH_{2n+1}$ or $OCOC_nH_{2n+1}$ and n is an integer of from 6 to 20, and recurring units of monomer B having the formula $$[CH_2=\underset{\underset{R_1}{|}}{C}-COO(CH_2CH_2)_{n1}-OOCCH=CH-COO]_m R_2 \qquad (II)$$

wherein $R_1$, is H or $CH_3$, $n_1$ is an integer of from 1 to 20, m is an integer of from 1 to 3, and $R_2$ is selected from the group consisting of H, Na, K, Mg, Mn, Ca, Li, Al and Co.

7. A liquid developer for electrophotography containing the non-aqueous resin dispersion of claim 1, and a pigment.

8. A liquid developer for electrophotography containing the non-aqueous resin dispersion of claim 3, and a pigment.

9. A liquid developer for electrophotography containing the non-aqueous resin dispersion of claim 4, and a pigment.

10. A liquid developer for electrophotography containing the non-aqueous resin dispersion of claim 5 and a pigment.

* * * * *